UNITED STATES PATENT OFFICE.

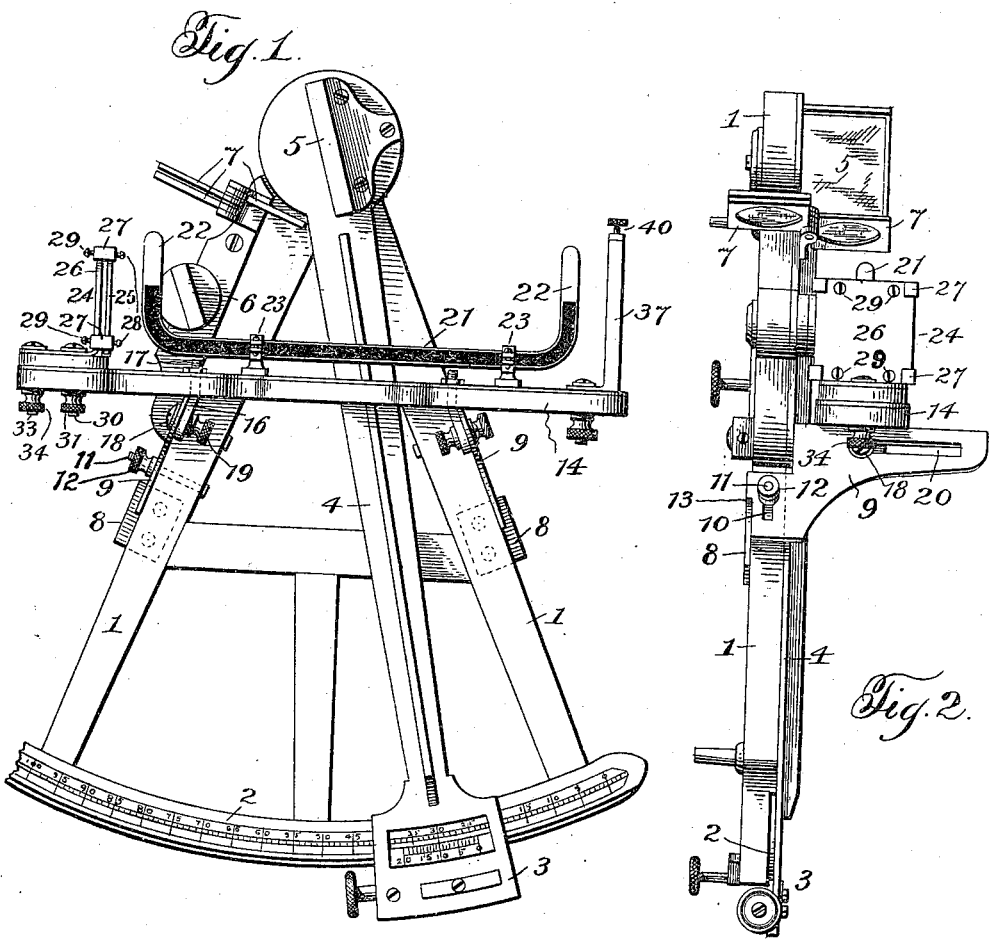
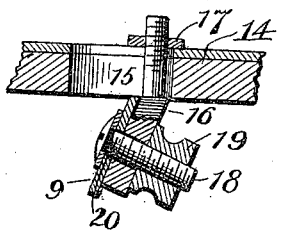

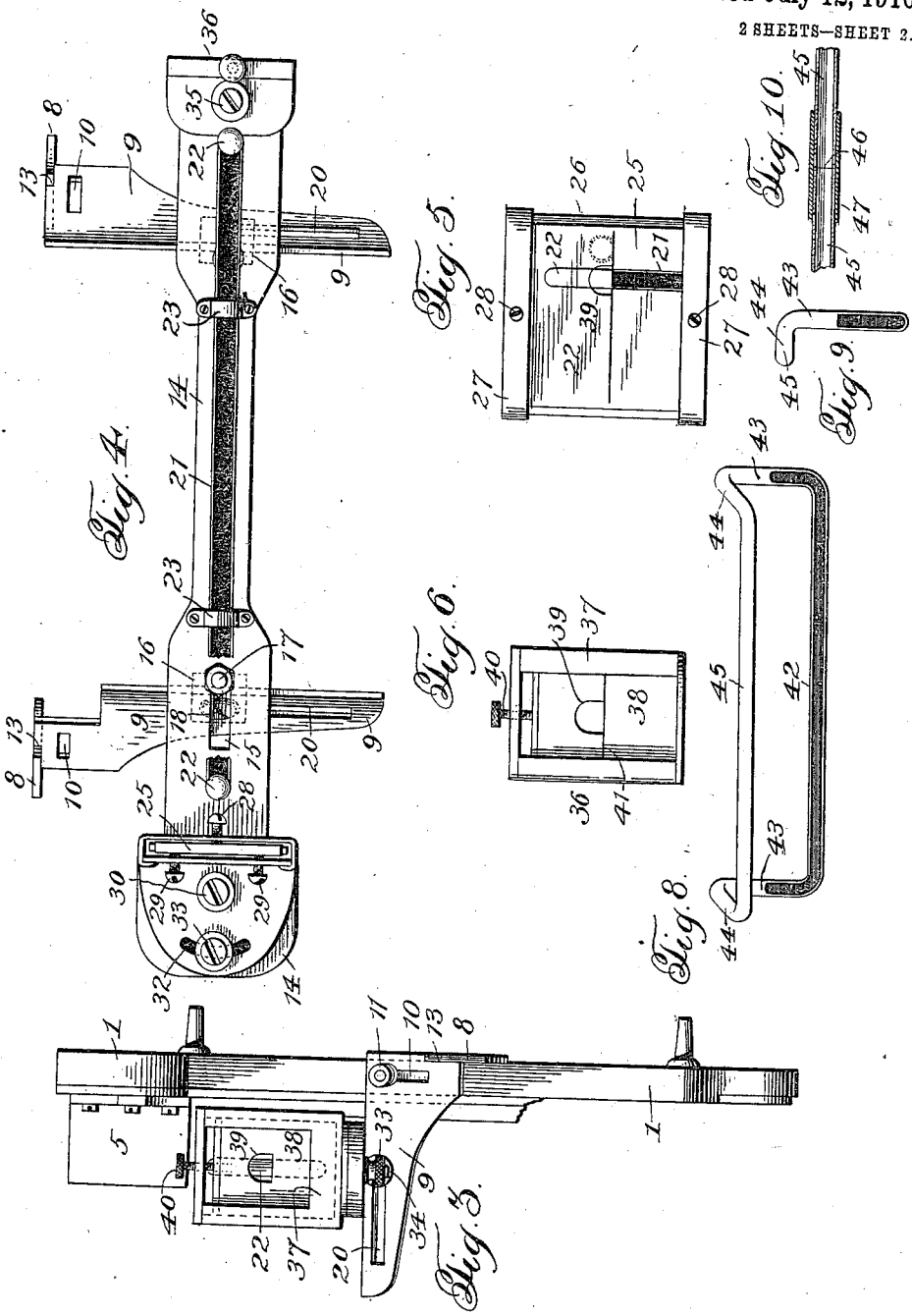

EMILY S. TAPLEY, OF BROOKSVILLE, MAINE, ADMINISTRATRIX OF JOHN P. TAPLEY, DECEASED.

HORIZON-GAGE.

964,069.  Specification of Letters Patent.  Patented July 12, 1910.

Application filed November 28, 1908. Serial No. 464,999.

*To all whom it may concern:*

Be it known that JOHN P. TAPLEY, deceased, late a citizen of the United States, and resident of Brooksville, in the county of Hancock and State of Maine, did invent certain new and useful Improvements in Horizon-Gages, of which the following is a specification.

This invention relates to improvements in astronomical instruments, and is particularly concerned with horizon gages for mariners' quadrants, octants and sextants.

The object of the present invention is the provision of a horizon gage in the form of an attachment that may be readily applied to and removed from quadrants and like instruments, whereby observations may be readily made when the natural horizon is obscured, as by fog, and the sun is visible.

The invention further aims to provide a horizon gage the construction of which is such as to insure accuracy in taking observations, and one wherein the parts are so related that in determining the altitude of the sun the same may be accomplished in the most simple manner, and by merely observing a single point to ascertain when the sun has been brought down into coincidence with the horizon, in contradistinction to watching the level for determining this fact.

The invention also seeks to provide a horizon gage that is adapted for use when the sea is rough and the wind blowing, as well as in smooth weather, thus adapting it for taking observations under all conditions.

Having these general objects in view, and others that will appear as the nature of the improvements is better understood, the invention consists substantially in the novel construction, combination and arrangement of parts hereinafter fully described, illustrated in the accompanying drawings, and pointed out in the appended claims.

In the drawings—Figure 1 is a side elevation of a quadrant equipped with a horizon gage constructed in accordance with the present invention. Fig. 2 is a front end elevation thereof. Fig. 3 is a similar view looking at the rear end. Fig. 4 is a top plan view of the gage and its supports removed from the quadrant. Fig. 5 is a detail elevation of the gage reflector, on a slightly enlarged scale, indicating its appearance when the sun has been brought down to the horizon. Fig. 6 is a similar view of the inner face of the sight vane. Fig. 7 is a detail sectional view illustrating the application of one of the fastenings for adjustably connecting the gage to its supporting plates. Fig. 8 is a detail perspective view of another form of tube that may be employed for the level. Fig. 9 is an end view thereof. Fig. 10 is a detail sectional view illustrating the manner of connecting the ends of the type of tube illustrated in Figs. 8 and 9 when said tube is not a continuous one.

Referring in detail to the drawings, the numeral 1 designates the plane or body of a quadrant, although it is obvious that any other instrument of like character may be substituted therefor, said body having the usual arc with graduations 2 thereon, and coöperating with said graduations is a vernier 3 carried by a radius 4 having the usual index glass 5. The body 1 is also provided with the usual horizon glass 6, between which and the index glass 5 are interposed the usual shade glasses 7.

As before premised, the present invention has in contemplation the provision of a horizon gage that is in the form of an attachment to be applied to and removed from the quadrant, and to the accomplishment of this end the plane or body 1 is provided at one of its sides with a pair of guide plates 8 that project slightly beyond the body 1. Coöperating with these guides 8 is a pair of supporting plates 9, and each of these plates has in proximity to one of its ends an elongated vertical slot 10 that receives a screw 11 fixedly connected to the plane 1, said screws carrying thumb nuts 12, whereby the supporting plates 9 are held upon the body 1. The ends of the plates 9 wherein the slots 10 are formed are also cut away as at 13, to provide rabbeted portions that receive the guide plates 8, and when the supporting plates 9 are thus engaged with the guide plates 8, the upper edges of the supporting plates 9 are horizontal, and perpendicular to the plane or body 1.

Seated upon the upper edges of the supporting plates 9 is a bar 14, which bar may be formed of any suitable material, and those portions of the bar 14 that are in proximity to the supporting plates 9 are formed with longitudinal slots 15 that receive the screw threaded shanks of fastening devices 16, clamping nuts 17 being carried by the screw threaded shanks of the fastening devices 16, and holding the latter in adjusted position in the slots 15. Adjusting screws 18 are carried by the fastening devices 16, thumb nuts 19 being associated with said adjusting screws, and said screws are received by horizontal slots 20 formed in the supporting plates 9, and extending at right angles to the slots 10. Through the slots 10 it will be seen that the supporting plates 9 may be adjusted vertically upon the plane or body 1, while the slots 20 provide for adjustment of the bar 14 toward and away from said plane or body.

A level 21 is carried by the bar 14, said level comprising a glass tube of substantially U-shape, whereby the level is provided with upwardly extending legs 22, and said level is sustained upon the bar 14 by suitable clamping devices 23. The glass tube referred to contains a body of mercury that extends up into the legs 22 to a point substantially midway the ends thereof, and said tube is preferably a closed one, the spaces in the legs 22 above the ends of the body of the mercury being vacuums to readily permit movement of the mercury in a manner characteristic in levels of this nature. The invention, however, is not restricted to the use of a closed tube, as the ends thereof may be opened, and the liquid therein freely movable in adjusting the position of the level. The closed tube is preferable by reason of its ability to confine the body of mercury, or other material in liquid form that may be placed therein.

In positioning the bar 14 relatively to the body 1 the same is effected in such manner that the level 21 will lie beneath the transparent portion of the horizon glass 6, the purpose of this appearing hereinafter. At the forward end of the bar 14, and at a point beyond the leg 22 at the forward end of the level 21, is arranged a glass reflector 24. This reflector comprises a mirror 25 that is mounted in a holder 26, which holder includes a pair of loops 27 one of which is arranged at the upper end and one at the lower end of said holder 26, and each of said loops is provided with a clamping screw 28 that engages the inner or exposed face of the mirror 25. Similar screws 29 are arranged in the holder 26 to impinge upon the concealed face of the mirror, a pair of these screws being employed with each of the loops 27, and their arrangement is such as to impinge against the mirror 25 at points contiguous to the edges of said mirror, and at the sides of the screws carried by the loops 27. Through the medium of screws 28 and 29, the angular position of the mirror may be readily adjusted in the holder 26.

In order to secure the holder 26 upon the forward end of the bar 14 a pivotal screw 30 is employed, said screw being provided with a thumb nut 31 by which said screw may be tightened, and said holder 26 is provided with an arcuate slot 32 that receives a fastening screw 33, also carried by the bar 14, and provided with a thumb nut 34 to clamp the screw 33 in adjusted position. The slot 32 is concentric with the pivotal screw 30, so that the holder 26 may be moved upon its pivot to the desired adjustment, whereupon the holder 26 is locked in such adjusted position by the screw 33.

At the rear end of the bar 14, and at a point beyond the rear leg 22 of the level 21, is pivotally mounted, through the medium of a screw 35, a sight vane 36. This vane comprises a vertically disposed guide 37 wherein is mounted a slide 38 having a sight opening 39, said slide being adjustable vertically in the guide 37 through the medium of a screw 40 that is mounted in the upper end of the guide 36. The slide 38 is preferably a card the surface of which that is exposed to the mirror 25 being white in order that the same may be readily seen in said mirror. The said opening 39 is substantially semi-oval in form, so that its lower edge forms a horizontal line, and the face of the slide 38 that is exposed to the mirror 25 is provided with a horizontal line 41, as a pen mark, whereby to render more clearly discernible the lower edge of the sight opening 39. The line 41 constitutes the horizon line. The slide 38 may be of ivory or celluloid.

In Figs. 8 and 9 is illustrated another form of tube that may be employed in lieu of the level 21. This form is a closed continuous glass tube comprising a lower horizontal arm 42 from the ends of which rise vertical legs 43 terminating at their upper ends in outwardly-extending horizontal offsets 44 which merge into an upper horizontal arm 45. This latter arm is parallel with the lower arm 42, but by reason of the offsets 44 said upper arm 45 is not in the same vertical plane as the lower arm 42, and, therefore, the arm 45 does not interfere with the horizon glass or other projecting portions on the plane or body 1. The tube illustrated in Figs 8 and 9 has, of course, sufficient vacuum to enable the mercury or other liquid confined therein to move properly within the tube. If desired, the tube just described need not be a continuous one, in which event its ends are brought together to form a joint 46 sealed by a ferrule 47, as illustrated in Fig. 10, said joint being preferably located in the upper arm 45.

In the use of the hereindescribed gage the line of vision is primarily determined by the levels of the mercury in the legs 22 of the tube 21, and the reflections of these levels in the mirror 25. Before this line of vision can be established the gage must be adjusted, which is accomplished in this manner: The reflector 24 is placed perpendicular to the plane of the bar 14, through the medium of the screws 28 and 29, but slightly inclined from its perpendicular to the plane or body 1, on the pivotal screw 30, so that when the eye is applied to the sight opening 39 the rear leg 22 as reflected by the mirror 25, will appear slightly to the right, or between the level 21 and the plane or body 1. This so positions the rear leg of the level that, as seen in the mirror 25, said leg is directly over the sight opening 39, and by referring to Fig. 5 of the drawings this position will be clearly observed. Furthermore, the reflection of the rear leg 22 will be seen from the sight opening 39 through the unsilvered portion of the horizon glass 6. When the gage has been thus adjusted the line of vision is established in this manner: The eye of the observer is applied to the sight opening 39, and by rotating the quadrant with the gage attached, in the plane or body 1, a point will be found where the levels of the mercury in the legs 22 and their reflection in the mirror 25 will coincide. At this point the gage is perfectly horizontal and the horizon line 41 is then adjusted to this level through the medium of the screw 40. To take an observation for determining the altitude of the sun, the instrument is held so that the level of the mercury or other material in the rear tube 22 will be coincident with the line 41 on the slide 38, as seen in the mirror of the reflector 24. If, now, the radius is manipulated so that the sun is brought down to the line 41, the sun, said line 41, and the level of the mercury in the rear tube 22 will jointly coincide, thus establishing the sun's altitude. This, it will be observed, is accomplished by merely watching the rear leg of the level as reflected by the mirror of the reflector 24, so that but a single point must be watched to determine the fact in question, thereby allowing an accurate observation to be taken in a most simple manner, and without the necessity of observing the level itself, as is commonly the case.

From the foregoing it will be seen that the hereindescribed invention provides a horizon gage that will enable observations to be taken so long as the sun is visible, even though the natural horizon may be obscured by fog, and inasmuch as there is but a single point to be watched in taking the observations, the invention is rendered especially useful when the sea is rough and the wind blowing. The gage may be applied either to quadrants, octants, or sextants with equal facility, so that the invention is not limited to any of these instruments.

Having thus described the invention, what is claimed as new, and desired to be secured by Letters Patent, is:

1. A horizon gage, comprising a level, a reflector associated therewith, and a sight vane also associated with said level and having an artificial horizon exposed for observation in said reflector.

2. A horizon gage, comprising a level, a reflector associated therewith and adjustable relative to the line of vision, and a sight vane also associated with said level and having an artificial horizon exposed for observation in said reflector.

3. A horizon gage, comprising a level, a reflector associated therewith and arranged in advance of the level, and a sight vane also associated with said level and arranged in rear thereof.

4. A horizon gage, comprising a level, a reflector associated therewith and arranged in advance of the level, said reflector being adjustable relative to the line of vision, and a sight vane also associated with said level and arranged in rear thereof.

5. A horizon gage, comprising a level, a reflector associated therewith and arranged in advance of the level, and a sight vane also associated with said level and arranged in rear thereof, said sight vane having an artificial horizon exposed for observation in said reflector.

6. A horizon gage, comprising a level, a reflector associated therewith and arranged in advance of the level, said reflector being adjustable relative to the line of vision, and a sight vane also associated with said level and arranged in rear thereof, said sight vane having an artificial horizon exposed for observation in said reflector.

7. A horizon gage, comprising a support, a level mounted upon said support and extending along the same, a reflector also carried by said support and arranged in advance of the level, and a sight vane carried by said support and arranged in rear of the level.

8. A horizon gage, comprising a support, a level mounted upon said support and extending along the same, a reflector also carried by said support and arranged in advance of the level, said reflector being adjustable relative to the line of vision, and a sight vane carried by said support and arranged in rear of the level.

9. A horizon gage, comprising a support, a level mounted upon said support and extending along the same, a reflector also carried by said support and arranged in advance of the level, said reflector being adjustable relative to the line of vision, and a sight vane carried by said support and arranged in rear of the level, said sight vane having an artificial horizon exposed for observation in said reflector.

10. A horizon gage, comprising a support, a level mounted upon said support, a reflector arranged in advance of the level and comprising a holder and a mirror adjustably mounted therein, and a sight vane carried by said support and arranged in rear of the level.

11. A horizon gage, comprising a support, a level mounted upon said support, a reflector arranged in advance of the level and comprising a holder adjustably mounted upon said support and a mirror adjustably mounted in said holder, and a sight vane carried by said support and arranged in rear of the level.

12. A horizon gage, comprising a support, a level mounted upon said support, a reflector arranged in advance of the level and comprising a holder and a mirror adjustably mounted therein, and a sight vane carried by said support and arranged in rear of the level, said sight vane having an artificial horizon exposed for observation in said reflector.

13. A horizon gage, comprising a support, a level mounted upon said support, a reflector arranged in advance of the level and comprising a holder and a mirror adjustably mounted therein, said holder being adjustably mounted upon said support, and a sight vane carried by said support and arranged in rear of the level, said sight vane having an artificial horizon exposed for observation in said reflector.

14. A horizon gage, comprising a support, a level mounted upon said support, a reflector arranged in advance of the level, and a sight vane carried by said support and arranged in rear of the level, said sight vane comprising a holder and a slide adjustably mounted therein.

15. A horizon gage, comprising a support, a level mounted upon said support, a reflector arranged in advance of the level, and a sight vane carried by said support and arranged in rear of the level, said sight vane comprising a holder, a slide adjustably mounted therein, and a screw for adjusting said slide.

16. A horizon gage, comprising a support, a level mounted upon said support, a reflector arranged in advance of the level, and a sight vane carried by said support and arranged in rear of the level, said sight vane comprising a holder and a slide adjustably mounted therein, said slide having an artificial horizon exposed for observation in said reflector.

In testimony whereof I have hereunto signed my name in the presence of two subscribing witnesses.

EMILY S. TAPLEY,
*Administratrix of the estate of John P. Tapley, deceased.*

Witnesses:
    LOUISE M. TAPLEY,
    ISAAC L. STOVER.